United States Patent
Brand et al.

(10) Patent No.: US 8,793,001 B2
(45) Date of Patent: Jul. 29, 2014

(54) PARAMETERIZATION MONITORING FOR ANALOG SIGNAL MODULES

(75) Inventors: Klaus Brand, Bad Salzuflen (DE);
Stephan Grewe, Lemgo (DE);
Hubertus Lohre, Steinheim (DE)

(73) Assignee: Phoenix Contact GmbH & Co. KG (DE)

( * ) Notice: Subject to any disclaimer, the term of this patent is extended or adjusted under 35 U.S.C. 154(b) by 836 days.

(21) Appl. No.: 12/118,258

(22) Filed: May 9, 2008

(65) Prior Publication Data

US 2009/0125157 A1    May 14, 2009

(30) Foreign Application Priority Data

May 11, 2007   (DE) .......................... 10 2007 022 631

(51) Int. Cl.
| | | |
|---|---|---|
| G05B 15/02 | (2006.01) | |
| G05B 19/18 | (2006.01) | |
| G05D 3/12 | (2006.01) | |
| G05D 5/00 | (2006.01) | |
| G05D 9/00 | (2006.01) | |
| G05D 11/00 | (2006.01) | |
| G05B 11/32 | (2006.01) | |
| H02H 9/08 | (2006.01) | |

(52) U.S. Cl.
USPC ............. 700/10; 700/292; 700/293; 318/625; 361/93.9

(58) Field of Classification Search
USPC ............. 700/292–293, 10; 361/93.9; 318/625
See application file for complete search history.

(56) References Cited

U.S. PATENT DOCUMENTS

| | | | | |
|---|---|---|---|---|
| 4,245,298 | A * | 1/1981 | Slater | 700/69 |
| 4,672,529 | A * | 6/1987 | Kupersmit | 700/1 |
| 5,737,169 | A * | 4/1998 | Sellers | 361/98 |
| 5,898,296 | A * | 4/1999 | Maddox et al. | 323/282 |
| 6,141,193 | A * | 10/2000 | Mercer | 361/18 |
| 6,449,136 | B2 * | 9/2002 | Galecki et al. | 361/93.9 |
| 6,912,427 | B1 * | 6/2005 | Pattee et al. | 700/13 |
| 7,443,648 | B2 * | 10/2008 | Cutter et al. | 361/139 |
| 7,502,665 | B2 * | 3/2009 | Giles et al. | 700/241 |

(Continued)

FOREIGN PATENT DOCUMENTS

| | | |
|---|---|---|
| DE | 199 48 552 A1 | 6/2001 |
| DE | 101 47 706 A1 | 4/2003 |
| DE | 103 57 797 A1 | 8/2005 |
| EP | 1643648 A2 | 4/2006 |

OTHER PUBLICATIONS

Thorsten Doerre, "European Search Report and Written Opinion", Jan. 18, 2010, Publisher: EPO, Published in: Munich.

*Primary Examiner* — Kavita Padmanabhan
*Assistant Examiner* — Jason Lin
(74) *Attorney, Agent, or Firm* — Keplan Breyer Schwarz & Ottesen, LLP

(57) ABSTRACT

The invention relates to a method for monitoring an output driver that can be parameterized and is suitable for controlling actuators in industrial automation technology, for applying analog signals to an output channel, with the following steps: determining resulting internal leakage power based on the parameterization data provided for parameterizing the output driver, comparing the leakage power relative to a leakage power limiting value, and, dependent functionally on the comparison result, stopping the application of an analog signal on the output channel corresponding to the parameterization data provided for parameterizing the output driver. The invention further relates to an analog signal output device, suitable for controlling actuators in industrial automation technology and in accordance with the aforementioned method, comprising at least one output driver and a monitoring device.

12 Claims, 3 Drawing Sheets

(56) References Cited

U.S. PATENT DOCUMENTS

| | | | |
|---|---|---|---|
| 2004/0032341 A1* | 2/2004 | Brenner et al. | 340/870.11 |
| 2004/0183588 A1* | 9/2004 | Chandrakasan et al. | 327/545 |
| 2004/0221185 A1* | 11/2004 | Bose et al. | 713/300 |
| 2004/0228055 A1* | 11/2004 | Pearson | 361/93.1 |
| 2004/0263106 A1* | 12/2004 | Gaessler et al. | 318/625 |
| 2006/0190785 A1* | 8/2006 | Pilling | 714/726 |
| 2007/0156367 A1* | 7/2007 | Kucukcakar et al. | 702/123 |
| 2008/0177494 A1* | 7/2008 | Siraky et al. | 702/122 |

\* cited by examiner

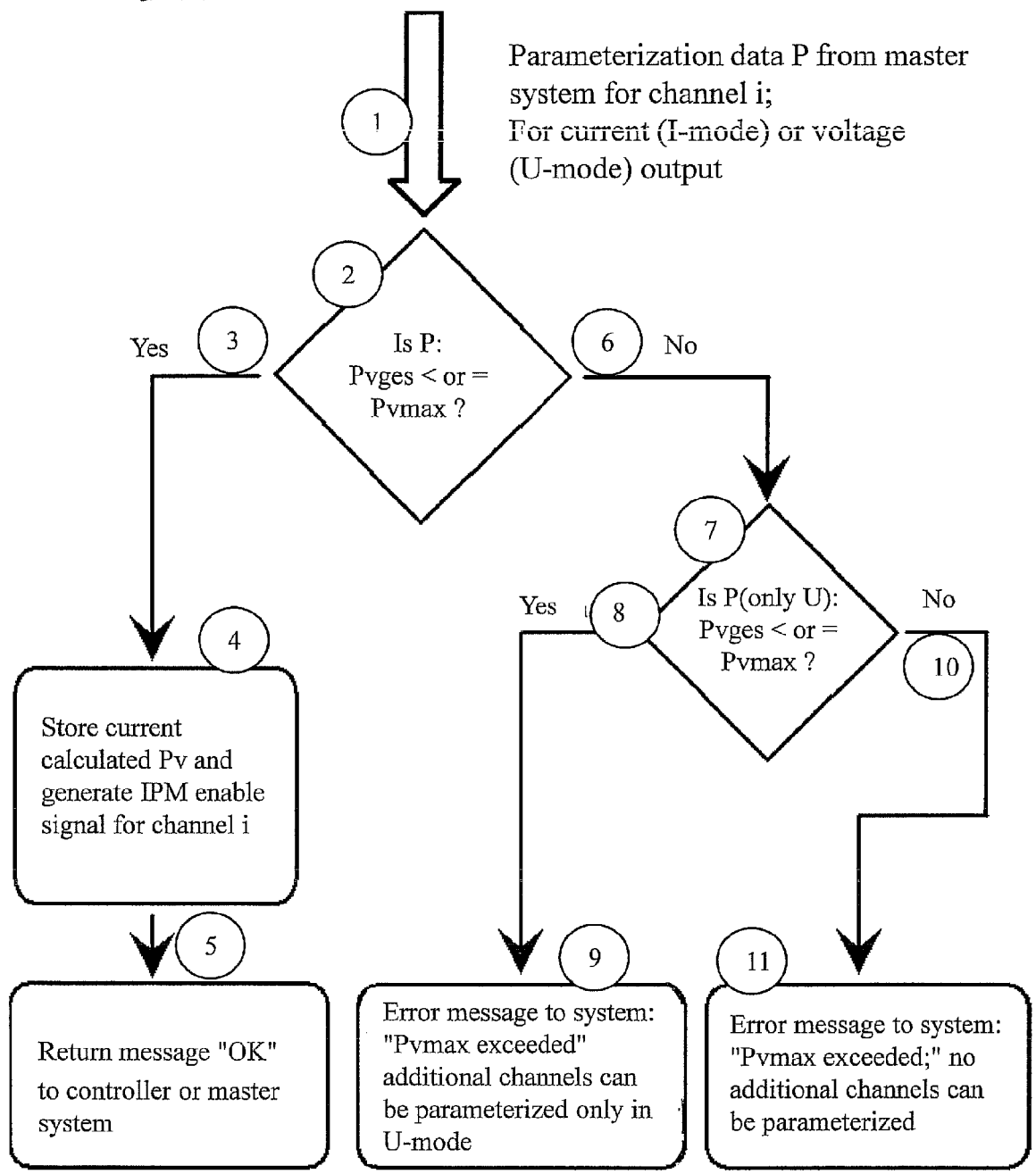

PARAMETERIZATION MONITORING FOR ANALOG SIGNAL MODULES

FIELD OF THE INVENTION

The invention relates to a method for monitoring an output driver, which can be parameterized and which is suitable for controlling actuators in industrial automation technology, for applying analog signals to an output channel, and also to an analog signal output device that is suitable for controlling actuators in industrial automation technology, especially for executing a method.

BACKGROUND OF THE INVENTION

In industrial automation technology, analog signals, which are provided by an analog signal output device on an output channel to which the actuator is connected as an external load, are frequently used for controlling actuators. Here, the analog signal output device can have one or a plurality of output channels. The analog signals provided for control essentially divide into current output signals and/or voltage output signals. The current output signals here typically run in a range around 20 mA, optionally also higher, and the voltage output signals in a range around 10V, optionally also higher. For a current signal provided on the output channel, due to a usually very wide burden range to be covered, e.g., between 0 and 550Ω, and the fact that usually alternating high and low loads must be operated, a high leakage power is produced at the driver output of the analog output stage. This is the case especially when very low-impedance loads must be operated within the analog signal output device for providing the desired or needed current output signals.

Consequently, depending on the heat dissipation of the electronic housing used for the analog signal output device, a so-called derating or limiting of the number of current output channels can occur.

Therefore, manufacturers of signal output modules for controlling actuators often specify for the user a small maximum burden to be connected from the outside for analog current outputs in certain modules, in order to limit the maximum power in the analog signal output device or specify for the user the preselection of a given burden range, e.g., between 0 and 300Ω or between 300 and 600Ω.

SUMMARY OF THE INVENTION

To eliminate an external burden limitation, there is in principle the possibility of performing load-dependent tracking of the supply voltage on the analog signal output device or the output drivers of the analog signal output device.

The invention is based on a problem of presenting a different and novel approach that is significantly improved with respect to the above-described state of the art and that allows the elimination of external burden limiting, at the same time with higher flexibility of such a signal output module.

Consequently, the invention provides a method for monitoring an output driver that can be parameterized and is suitable for controlling actuators in industrial automation technology, for applying analog signals on an output channel, wherein the resulting, internal leakage power based on the parameterization data provided for parameterizing the output driver is determined and compared relative to a leakage power limiting value, and wherein a corresponding application of an analog signal to the output channel based on parameterization data is stopped dependent functionally on the comparison result.

Furthermore, in a preferred construction, an error signal is generated when stopped.

In an advantageous improvement, it is further provided that when stopped, the application of a signal based on different parameterization data is enabled.

It is further advantageous to generate an enable signal for the corresponding application dependent functionally on the comparison result.

For further increasing the security, this enable signal is combined with a second enable signal, which is received for creating a signal to be applied from a control and/or automation system providing the parameterization data, in order to enable the signal application.

As another solution, the invention provides an analog signal output device which is suitable for controlling actuators in industrial automation technology, especially for performing a method described above, wherein the device includes at least one output driver which can be parameterized for applying analog signals on an output channel, and a monitoring device which is adapted, based on parameterization data provided for parameterizing the output driver, to determine a resulting, internal leakage power and to compare this with a leakage power limiting value, and also to stop the corresponding application of an analog signal to the output channel based on the parameterization data, dependent functionally on the comparison result.

In an especially preferred analog signal output device according to the invention, current and/or voltage signals to be applied on the output channel can be parameterized.

According to a practical construction, the analog signal output device is part of a higher order control or automation system, by means of which the parameterization data can be provided.

It is a further advantage if the monitoring device, when stopped, generates an error signal for the control or automation system.

For extensive flexibility, the monitoring device is adapted to stop the application of a signal based on different parameterization data when the application of a current signal is stopped.

To guarantee an explicit enable, the monitoring device is further adapted to generate an enable signal for the corresponding applications dependent functionally on the comparison result.

To further increase the enable security, the analog signal output device advantageously has an enable unit that is adapted to cause the enable for applying a signal only as a function of a first enable signal from the control and/or automation system for generating a signal to be applied according to parameterization setting and a second enable signal from the monitoring device.

Preferred analog signal output devices according to the invention have a plurality of output channels, with at least one output driver for applying analog current signals or voltage signals.

Advantageously, the analog signal output device can be built application-specifically and can be, e.g., a separate analog output device with local intelligence, a combination of intelligent controller with a coupled analog output module, or a multifunctional I/O module for receiving analog current and/or voltage signals and for outputting analog current signals and voltage signals.

Consequently, one essential idea of the invention is that intelligent parameterization monitoring, also referred to for short as IPM below, is to be performed before applying an output signal. In a practical, preferred construction, analog current and voltage output stages advantageously universal, are used, wherein, with the help of the intelligent parameterization monitoring, which is integrated, e.g., in an analog output module, the parameterization of the analog output stages is monitored. Due to the monitoring, the parameterization will enable only a maximum permissible number of output stages for providing current output signals. Other channels can then still be operated, if necessary, as voltage outputs. Advantages are, in particular, that first, an external burden limiting can be eliminated, and second, it is guaranteed for no impermissible leakage power overshoots within the module to be produced. In addition, the invention guarantees high flexibility of the analog output stages, because, in principle, all of the analog current and voltage output signals can be generated at each output. The IPM operates essentially according to an enable mechanism, according to which the parameterization of an analog output channel takes place only when the maximum permissible leakage power limit is not exceeded in the analog signal output device. If, based on the parameterization data, this leakage power limit cannot be maintained, then the IPM stops the enabling of the analog output channel and advantageously generates a corresponding error message, e.g., that the maximum permissible leakage power limit is exceeded and additional channels can still be parameterized only in the voltage output mode. The error message is reported back to a control system or the automation system, which has provided the parameterization data so that new alternative parameterization data taking the error message into account can be generated Consequently, with the invention, the output channels, e.g., of an analog eight-channel output module can be parameterized differently. This can be, e.g., a parameterization that provides eight voltage outputs, or four current outputs and four voltage outputs. The IPM preferably monitors not only the parameterization itself, but also issues an enable signal, which is linked logically with an enable signal of the control system or automation system, e.g., by a logical "AND" link. From this, the most secure enable signal for the analog output driver can be generated in a simple way.

BRIEF DESCRIPTION OF THE DRAWINGS

Additional features and advantages of the invention will become apparent below with reference to the description of a preferred embodiment under consideration of the accompanying drawings.

Shown in the drawings are:

FIG. 3 is a flow chart concerning a preferred construction for monitoring analog signals, which are suitable for controlling actuators and which are applied on one or more output channels.

DETAILED DESCRIPTION

A preferred embodiment of the invention will be described for the sake of example below.

Figure 1:
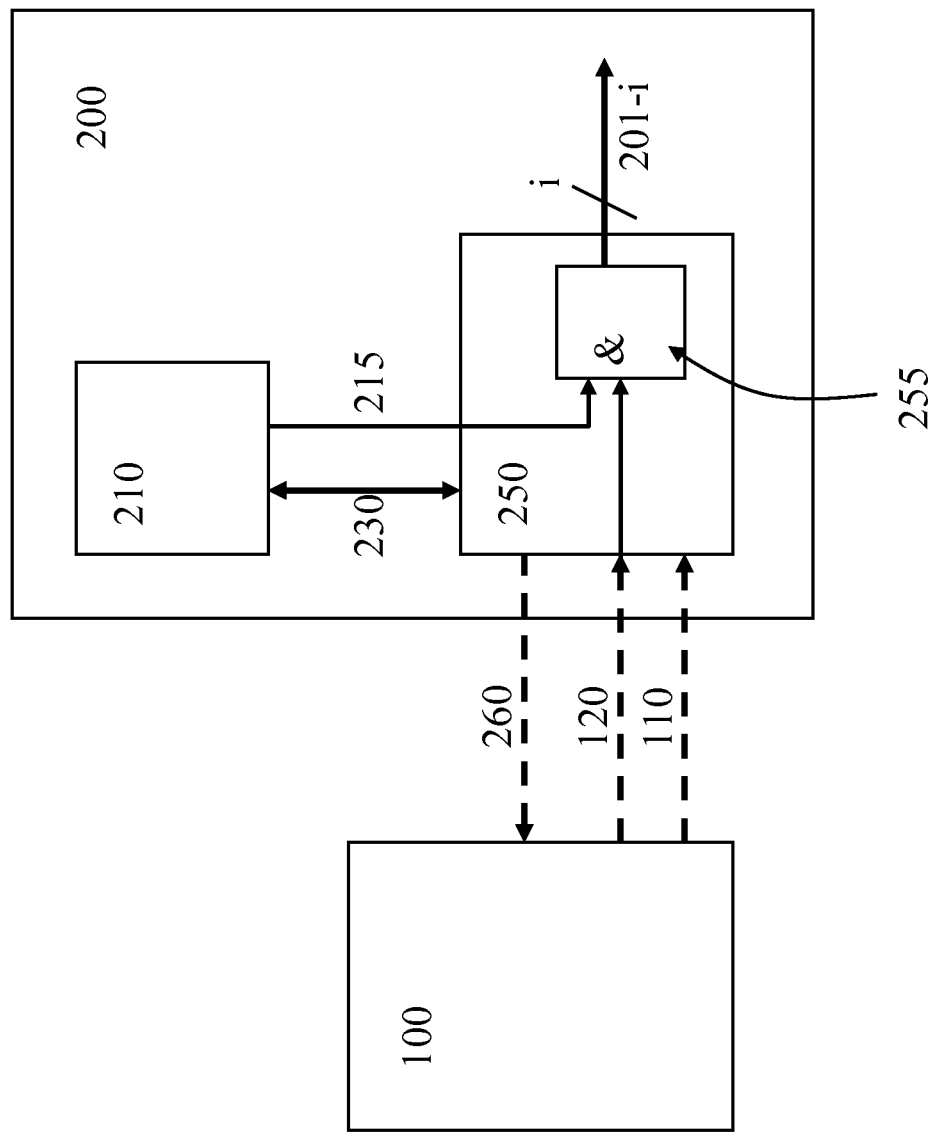
FIG. 1 is a general schematic diagram of an analog signal output device according to the invention.
Figure 2:
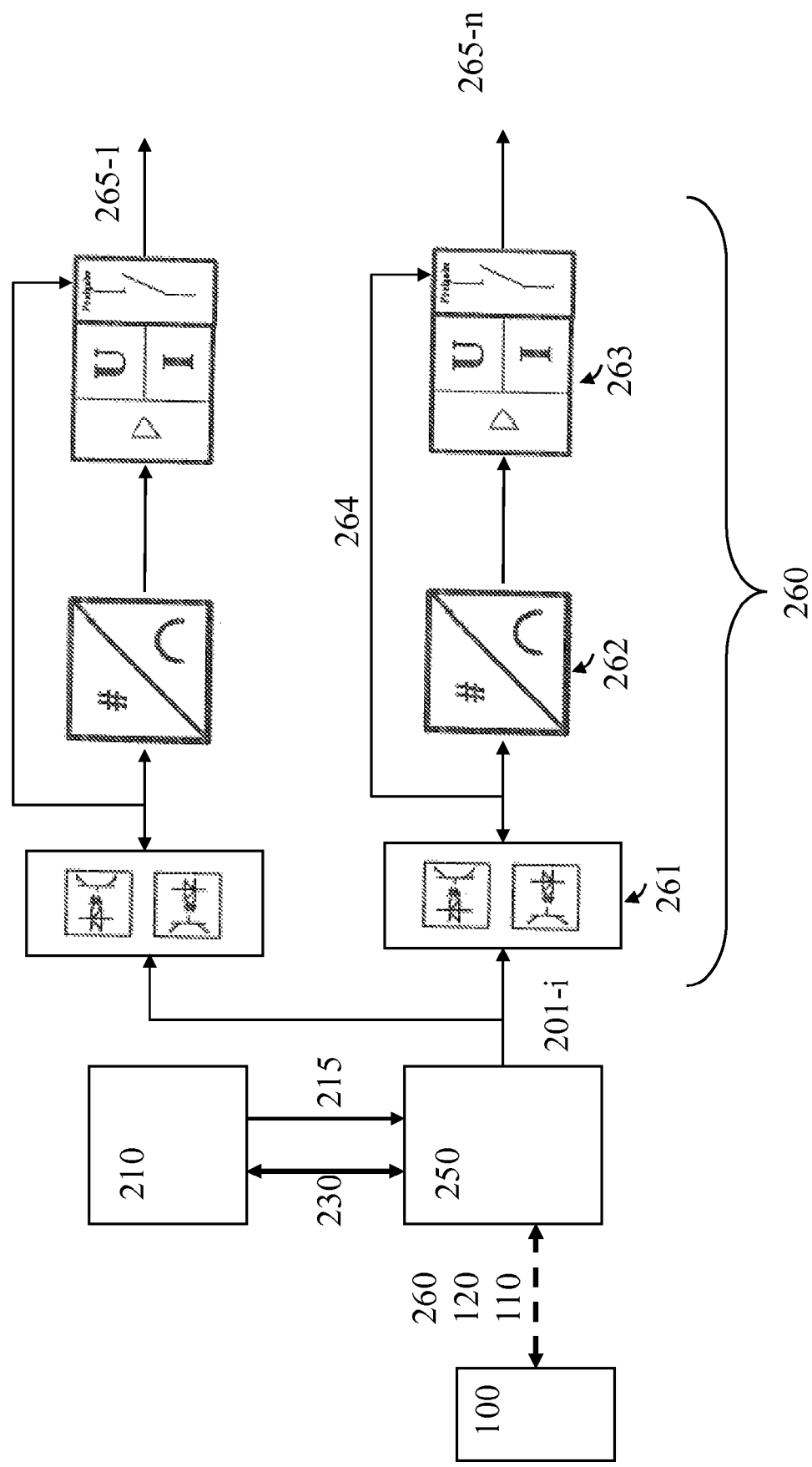
FIG. 2 is a schematic diagram of the analog signal output device according to the invention from FIG. 1 with a processing chain, shown schematically, for the individual enabling of a plurality of output channels.

Shown in FIGS. 1 and 2 are a general schematic diagram of an analog signal output device 200 according to the invention with a pre-connected or higher-order control or automation system 100 and, respectively, an expanded schematic diagram of the signal output module 200 according to the invention from FIG. 1 with a processing chain 260 for individual control and enabling of a plurality of n output channels 265-1, 265-*n*.

The shown analog signal output device 200 is connected to the control or automation system 100 via one or more communication channels for exchanging data, e.g., in the form of packets, and thus forms, for all practical purposes, a part of the control or automation system 100. The analog signal output device includes a control unit 250, e.g., in the form of a microcontroller, as well as a device 210 connected for intelligent parameterization monitoring to the control unit 250. The control unit 250 of the signal output module 200 is further connected to a processing chain 260, which is connected to a number n of output channels 265-1, 265-*n*. In the present example, the processing chain 260 has, first of all for each output channel 265-*i*, where i=1 . . . n, a coupling device 261 connected to the control unit, in particular, in the form of a signal isolator, such as, e.g., an optocoupler, or a capacitive, magnetoresistive, or inductive signal isolator, for galvanic separation of the devices connected upstream and downstream of this coupling device, so that damage or signal distortion due to interactions between the devices connected upstream and downstream is essentially ruled out. In the example, the signals transmitted from the control unit 250 to the processing chain 260 are digital signals and are converted, in turn, into digital signals by the coupling device(s) 261. Thus, a digital/analog converter 262 and an analog output driver 263 are connected in series on the output side of each coupling device 261. The output drivers 263 can be parameterized preferably for the optional application of current signals and voltage signals. The parameterization can be realized, in principle, in any way known to someone skilled in the art, so that the circuitry needed for this purpose is not shown in detail for reasons of clarity. The signal path leading from each coupling device 261 to the digital/analog converter 262 is further branched and set parallel to an enable switching device integrated in the output driver.

Via a communications channel, the system 100 transmits defined, typically application-specific parameterization data 110 for parameterizing an output driver of one or more output channels on the analog signal output device 200 and especially on the control unit 250, which, in principle, performs the further parameterization. Such parameterization data 110 provided for the analog signal output device 200 via the system 100 defines, e.g., the output channel to be parameterized via an output driver, including the setting of whether this is to be operated for current output or for voltage output and in which current or voltage ranges and burden ranges it is to be operated.

Furthermore, an enable signal 120 is transmitted to the analog signal output device 200 and especially to the control unit 250, in order, from the viewpoint of the system 100, to enable one or more defined output channels according to the given parameterization, which causes the corresponding application of a signal output.

The enable signal 120 coming from the system 100 is led to a logic component 255 of the control unit 250, which outputs a corresponding enable signal 201-*i* for enabling the desired parameterization for the output channel or channels determined by the system to the downstream processing chain 260, preferably only when a corresponding enable signal 215 is also present from the device 210 for intelligent parameterization monitoring, as described below. The control of the output driver allocated to each output channel is performed, e.g., in series, by means of such an enable signal or several such enable signals 201-*i*.

In each case, before the output of such an enable signal 201-*i* by the control unit 250, the control unit 250 transmits the parameterization data 110 obtained by the system 100 initially via a communications channel 230 to the device 210 for intelligent parameterization monitoring. This device tests whether a maximum permissible leakage power limit is not exceeded for a corresponding parameterization of the output channel or channels. If the test finds that the maximum permissible leakage power limit will be exceeded by the corresponding parameterization of the output channel or channels, then the device 210 for intelligent parameterization monitoring returns, via the communications channel 230, an error signal, which is advantageously also fed back to the system 100, as indicated with the reference symbol 260. If the test finds that the maximum permissible leakage power limit is not exceeded by the corresponding parameterization of the output channel or channels, the device 210 for intelligent parameterization monitoring outputs an enable signal 215 to the control unit 250, and this signal is led to the logic component 255 of the control unit 250.

Thus, in this case, based on and in association with certain parameterization data 120, the enable signal 120 coming from the system 100 and the enable signal 215 coming from the device 210 are applied. Through a simple, logical "AND gate," it can thus be guaranteed that, only in this case, a corresponding enable signal 201-*i* is also output by the logic component 255 for enabling the given parameterization in order to apply a corresponding analog signal on the defined output channel or channels to the subsequent processing chain 260.

FIG. 3 shows a flow chart related to a preferred construction of a sequence of intelligent parameterization for monitoring an output driver, which can be parameterized and which is suitable for controlling actuators in industrial automation technology, for applying analog signals on an output channel.

According to FIG. 3, parameterization data P for a parameterization request of a system 100 concerning one or more output channels i each with respect to a desired current output (I mode) or voltage output (U mode) is transmitted in a first step 1 to the intelligent parameterization monitoring device.

On the basis of the parameterization data, the intelligent parameterization monitoring device determines the power "Pvges," which is produced in practice in the affected device, that is, especially in the analog signal output device as a whole and/or in the output driver/s when the parameter request is implemented. This determined or calculated power is then compared in a next step 2 relative to a predetermined power threshold "Pvmax" and it is assumed that all of the determined power components lying above the threshold represent an impermissible leakage power.

On the basis of all of the parameterization data P and also, optionally, already parameterized output drivers and correspondingly enabled output channels, the intelligent parameterization monitoring device knows what current and/or what voltage has been applied or is still to be applied to what output channels, the measurement range, in which operation is to be performed, and what internal burdens must be operated or still must be operated. Accordingly, even before an actual new parameterization and enabling for applying signals to the output channels, it can already be determined whether affected devices would be overloaded.

If the test 2 finds in step 3 that the determined power still lies below the threshold, the current determined or calculated power is stored in a subsequent step 4 and an IPM enable signal is generated for the corresponding output channels to be parameterized, and then a corresponding OK return message is transmitted to the system 100, assigned the reference number 4 in FIG. 3.

In contrast, if the test 2 finds in step 6 that the determined power no longer lies below the threshold and thus the affected device would be overloaded, it is preferably also tested whether in a subsequent step 7, for parameterizing the output drivers for operation of the output channels only as voltage output channels, the power would still lie within the maximum leakage power limits. This can definitely be the case specific to the application, because voltage outputs offer the advantage that essentially no current flows there and thus no power is transferred at least at the driver output. If this test 7 has the result 8 that output channels could still be allowed to be operated as voltage outputs and enabled accordingly, then an error message is generated for the system 100 in a subsequent step 9, wherein this error message indicates that, for the tested parameterization, the maximum leakage power is exceeded, but additional channels can still be parameterized for a voltage mode.

If this test 7 has the result 10 that the leakage power limit would be exceeded in each case, then an error message is generated for the system 100 in a subsequent step 11, wherein this error message indicates that, for the tested parameterization, the maximum leakage power is exceeded in each case and no additional channels can still be parameterized, either in current mode or in voltage mode.

Here, the leakage power is considered for the affected device as a whole, thus, in the present case according to FIGS. 1 and 2, for the analog signal output device. Determining the actual power is advantageously performed for each channel individually, because typically a parameterization tool is used for a user via the system 100, essentially independently of the type of the system, by means of which all of the options on how the device is to be set can be selected and thus each output channel can be set individually. Consequently, a decision can be made in principle for each channel individually whether it should be a current output channel or a voltage output channel, what measurement range should be covered, and what effective range it should have. Thus, based on the given combinations in the parameterization packet, it can then be calculated by means of the intelligent parameterization packet whether the device will be overloaded or not and, with reference to this, a return message can be generated and fed back.

Requirements in analog output modules to convert both current outputs and also a large channel number of voltage outputs can now be realized with the invention in a very simple way, so that the invention thus reduces the previously necessary number of variants of analog output modules with maximum flexibility. Thus, advance consideration of what external burden is present or may be present is no longer absolutely necessary.

It is obvious to someone skilled in the art that the invention is not limited to the embodiment described above, but instead can be varied in many different ways. In particular, features can be combined with each other in other different ways, even if not explicitly specified.

What is claimed is:
1. A method comprising:
monitoring a plurality of at least two output drivers, with each output driver in the plurality capable of being parameterized for controlling actuators in industrial automation technology and for applying analog signals to an output channel;

calculating a resulting leakage power that is produced in practice based on parameterization data provided for parameterizing one or more output drivers in the plurality;

comparing the leakage power relative to a leakage power limit; and enabling or stopping, dependent functionally on the comparison result, the application of an analog signal on an output channel that corresponds to the parameterization data provided for parameterizing the one or more output drivers.

2. The method according to claim 1, wherein, when stopped, an error signal is generated.

3. The method according to claim 1, wherein, when stopped, the application of a signal based on different parameterization data is enabled.

4. The method according to claim 1, wherein, dependent functionally on the comparison result, a first enable signal is generated for the corresponding application.

5. The method according to claim 4, wherein the first enable signal is combined with a second enable signal, which is received for generating a signal to be applied from a control and/or automation system providing the parameterization data, for enabling the application.

6. An analog signal output device for controlling actuators in industrial automation technology, comprising:

a plurality of at least two output channels, each output channel in the plurality having at least one output driver for corresponding application of analog current signals or voltage signals, and wherein the at least one output driver can be parameterized for applying analog signals to an output channel; and a monitoring device that is adapted, based on parameterization data provided for parameterizing each output driver of the at least one output driver, i) to calculate a resulting internal leakage power that is produced in practice, ii) to compare the internal leakage power to a leakage power limit, and iii) to enable or to stop the corresponding application of an analog signal to at least one output channel in the plurality based on the parameterization data, dependent functionally on the comparison result.

7. The analog signal output device according to claim 6, wherein the device is part of a higher order control or automation system, by means of which the parameterization data is provided.

8. The analog signal output device according to claim 7, wherein the monitoring device is further adapted, when stopped, to generate an error signal for the control or automation system.

9. The analog signal output device according to claim 6, wherein the monitoring device is further adapted to enable the application of a signal based on different parameterization data when the application of a current signal is stopped.

10. The analog signal output device according to claim 6, wherein the monitoring device is further adapted to generate, dependent functionally on the comparison result, an enable signal for the corresponding application.

11. The analog signal output device according to claim 6, further comprising an enabling unit that is adapted to generate the enable for applying a signal, as a function of a first enable signal from the control and/or automation system for generating a signal to be applied according to parameterization setting, and a second enable signal from the monitoring device.

12. The analog signal output device according to claim 6, which is a separate analog output device with intelligence, a combination of intelligent controller with coupled analog output module, or a multi-functional I/O module for receiving analog current and/or voltage signals and for outputting analog current signals and voltage signals.

* * * * *